Patented Dec. 18, 1951

2,579,341

UNITED STATES PATENT OFFICE 2,579,341

PREPARATION OF PHENYLCHLOROSILANES

William A. Schwenker, Scotia, N. Y., assignor to General Electric Company, a corporation of New York No Drawing. Application March 3, 1951, Serial No. 213,801

5 Claims. (Cl. 260—448.2)

This invention is concerned with the preparation of phenylchlorosilanes. More particularly, the invention relates to a process for preparing phenylchlorosilanes which comprises passing chlorobenzene in the presence of a small amount of sodium chloride over commercial silicon containing traces of aluminum at an elevated temperature, preferably in the presence of a catalyst for the reaction.

Rochow Patent 2,380,995, issued August 7, 1945 and assigned to the same assignee as the present invention discloses the preparation of phenylchlorosilanes, for example, phenyltrichlorosilane, diphenyldichlorosilane, etc., by the passage of chlorobenzene, specifically monochlorobenzene, over silicon. The temperatures employed in such reactions are of the order of from about 250° C. to below the decomposition point of the ingredients or the formed reaction products, for example, temperatures ranging from about 300° to 575° C. In some instances, it has been particularly advantageous to employ catalysts for the reaction between the chlorobenzene and the silicon as, for instance, silver, copper, etc.

When such a reaction is carried out using commercial silicon, it has been found that there are undesirable losses of the formed phenylchlorosilanes due apparenttly to some decomposition action which cleaves the phenyl groups from the silicon atoms. Although it is not absolutely certain what has caused this decomposition of the phenylchlorosilanes, nevertheless it is believed that such decomposition may be due to the presence of small amounts of aluminum in the commercial silicon which is ordinarily employed in the reaction. This aluminum is believed to combine with chlorine found during the reaction to form aluminum chloride; and it is this latter aluminum chloride which is believed to cause the cleavage of the phenyl groups. Because of this cleavage, there have been reduced yields of phenylchlorosilanes as well as the necessity for added distillations in order to remove decomposition products from the reaction product containing the desired phenylchlorosilanes.

I have now discovered that ultimate improved yields of phenylchlorosilanes produced by the passage of chlorobenzene over finely divided commercial silicon can be obtained by employing small amounts of sodium chloride with the silicon powder. This improvement in ultimate yield of phenylchlorosilanes results from the fact that there is little, if any, decomposition of the formed phenylchlorosilanes during subsequent distillation and isolation thereof, thus requiring fewer distillation steps.

Additionally, it has been found that after the silicon-catalyst powders have been used to substantial exhaustion, the presence of the sodium chloride decreases markedly the tendency of the powder to cake and plug which heretofore was a serious disadvantage in prior reactions between the ingredients. Finally, it was found that after the reaction was completed, the presence of the sodium chloride permitted voiding the reactor of the silicon-catalyst powders readily without requiring any mechanical prodding.

The amount of sodium chloride employed is fairly small and may range, for instance, from about 1 to 10%, by weight, preferably from 2 to 5 per cent, based on the weight of the silicon. The silicon powder is the usual commercial powder employed in such reactions which contains about 0.1 to 2 per cent, by weight, thereof aluminum including fractional small amounts of other impurities as, for example, iron, calcium, manganese, etc. Generally, I prefer to employ a commercial silicon powder which comprises at least 75% silicon. In this respect, I may use such silicon powders as essentially pure silicon containing only aluminum as the impurity or silicon in combination with metals such as iron, silver, etc. Generally commercial silicon employed in the above-described reaction contains at least 97 per cent silicon.

In carrying out the invention, many of the conditions which are more particularly disclosed or taught in the aforementioned Rochow patent may be employed and the latter patent because of its more than adequate disclosure is made a part of the present disclosures. The catalyst may comprise from about 0.2 to 25 per cent, by weight, based on the total weight of the silicon and the catalyst. Generally, the catalyst and silicon powders are mechanically mixed together to form a homogeneous mixture and placed in the reactor so that the chlorobenzene may be passed through such powder. It has been found advantageous to heat the chlorobenzene so that the temperature of reaction ranges from about 250° to 600° C., e. g., from 300° to 575° C., and the reaction between the chlorobenzene and the silicon is effected while the chlorobenzene is in the vapor phase. Varying pressure conditions, for example, atmospheric or superatmospheric conditions may be employed and I have found that somewhat increased yields are realized when pressures of the order of from about 50 to 500 p. s. i. are used during the reaction.

In order that those skilled in the art may better understand how the present invention may be practiced, the following example is given by way of illustration and not by way of limitation. All parts are by weight. The reactor used in each of the instances described below was a 6″ inside diameter reactor, 10′ long of the "fluid-bed" type having a diffuser plate at the bottom to distribute the gas feed evenly, and a porous ceramic filter at the top to separate entrained solids from the product gas stream. Heating was done by means of a jacket through which hot flue gas was circulated.

Example

In this example, the powder charge employed comprised 60 parts of powder (about 200 mesh or finer) of which 2%, by weight, was finely divided silver powder and 98%, by weight, was finely divided commercial silicon (97 per cent silicon, and fractions of one per cent of iron, manganese, and calcium, and containing from 0.71 to 1 per cent aluminum). In this mixture of powders was homogeneously dispersed three parts finely divided sodium chloride. Monochlorobenzene was fed up through the reactor in a fluidizing fashion by heating the chlorobenzene to 300° C. and feeding through the reactor at a rate of 150 parts per hour while the temperature of the reactor was maintained at about 550° C. and the pressure therein was about 100 p. s. i. The length of the reaction run was about 12 hours. As a control, another reaction was conducted under essentially the same conditions with the exception that no sodium chloride was added to the mixture of silicon and silver powders. Each reaction product was then fractionally distilled until the pot temperature was around 240 to 250° C. Thereafter, to determine the degree of decomposition, each residue was refluxed under heat at atmospheric pressure for 5 hours. During these refluxings, the mixture containing sodium chloride showed little if any drop in head temperature and the amount of decomposition of the phenylchlorosilanes was of the order of at most about 0.2 per cent of the amount of phenylchlorosilanes in the mass. In contrast to this, the refluxed mass derived from the reaction product free of sodium chloride showed a large drop in head temperature (of the order of about 14 degrees) due to the formation of low boiling decomposition products, namely e. g., benzene and $SiCl_4$, and the amount of decomposition of the phenylchlorosilanes was of the order of about 5.1 per cent on the same basis as above. In addition, after removal of the lower boilers up to and including chlorobenzene, subsequent distillation of the residues to obtain phenylchlorosilanes, (e. g., phenyltrichlorosilane, diphenyldichlorosilane, etc.), in the case of the original reaction product containing sodium chloride, resulted in a substantially colorless, overhead product of phenylchlorosilanes uncontaminated with low boiling decomposition products. In contrast to this, distillation of the residue from the reaction product containing no sodium chloride, resulted in a dark overhead product of phenylchlorosilanes contaminated with low boiling decomposition products, for the most part benzene and $SiCl_4$.

It was also found that the reactor containing the sodium chloride interspersed with the silicon and silver could be readily cleaned out by merely permitting the non-agglomerated particles of solid material to flow from the reactor. In contrast to this, the reactor which contained no sodium chloride had caked and plugged up so so that it was necessary to use mechanical force to aid in removal of the silicon-silver mass.

It will, of course, be apparent to those skilled in the art that other types of commercial silicon powders containing varying amounts of aluminum and different particle sizes, many of which are described in the aforementioned Rochow Patent and in Gilliam et al. Patents 2,466,412 and 2,466,413 both issued April 5, 1949, may be employed without departing from the scope of the invention. The silicon may be in the form of finely divided silicon intermixed with the finely divided catalyst, or it may be alloyed with the catalyst and thereafter powdered to give a homogeneous finely divided powder bed to which the sodium chloride may be added. Such alloys are more particularly disclosed and claimed in Rochow et al. Patents 2,380,996 and 2,383,818 as well as in the aforementioned Gilliam et al. Patent 2,466,412.

It will be apparent that the amount of sodium chloride may also be varied and generally should comprise an amount thereof sufficient to reduce decomposition of the formed phenylchlorosilanes to as small a value as possible. This will advantageously call for an amount of sodium chloride at least molarly equal to and preferably in excess of (for example, from 1 to 4 times) the molar concentration of the aluminum in the silicon powder. The temperature and pressure conditions may also be modified to suit the available apparatus and conditions.

What I claim as new and desire to secure by Letters Patent in the United States is:

1. The method of making phenylchlorosilanes which comprises passing at an elevated temperature chlorobenzene over a contact mass comprising finely divided commercial silicon containing traces of aluminum, there being present in the powder from about 1 to 10%, by weight, sodium chloride, based on the weight of the silicon.

2. The process which comprises passing at an elevated temperature monochlorobenzene over a contact mass comprising a mixture of finely divided powders containing a preponderant amount of finely divided aluminum-containing commercial silicon and a minor proportion of finely divided silver powder, the said mixtures of powders containing 1 to 10%, by weight, sodium chloride, based on the weight of the silicon.

3. The process as in claim 2 wherein the temperature at which the reaction is carried out is from about 250° to 575° C.

4. A contact mass for making phenylchlorosilanes from the chemical reaction between silicon and chlorobenzene, said contact mass comprising essentially finely divided aluminum-containing commercial silicon, a minor proportion of a catalyst for the reaction, and from 1 to 10%, by weight, sodium chloride, based on the weight of the silicon.

5. A contact mass as in claim 4 wherein the catalyst comprises finely divided silver powder.

WILLIAM A. SCHWENKER.

No references cited.